United States Patent [19]
Matano et al.

[11] Patent Number: 5,201,544
[45] Date of Patent: Apr. 13, 1993

[54] KNEE PROTECTOR DEVICE FOR AUTOMOTIVE VEHICLE

[75] Inventors: Minoru Matano; Naofumi Ito, both of Kanagawa, Japan

[73] Assignee: Nissan Motor Co., Ltd., Yokohama, Japan

[21] Appl. No.: 686,450

[22] Filed: Apr. 17, 1991

[30] Foreign Application Priority Data

May 22, 1990 [JP] Japan .................................. 2-132304

[51] Int. Cl.⁵ .............................................. B60R 21/04
[52] U.S. Cl. ..................................... 280/751; 280/752
[58] Field of Search ............... 280/751, 752; 296/70; 180/90

[56] References Cited

U.S. PATENT DOCUMENTS

| | | | |
|---|---|---|---|
| 3,930,665 | 1/1976 | Ikawa | 280/751 |
| 4,320,909 | 3/1982 | Nakamori et al. | 280/752 |
| 4,834,422 | 5/1989 | Oikawa et al. | 280/751 |
| 4,893,834 | 1/1990 | Honda et al. | 280/751 |
| 4,946,192 | 8/1990 | Kuwahara | 280/751 |

FOREIGN PATENT DOCUMENTS 58-150552 10/1983 Japan .

Primary Examiner—Robert P. Olszewski
Assistant Examiner—Tuan N. Nguyen
Attorney, Agent, or Firm—Pennie & Edmonds

[57] ABSTRACT

A knee protector device for protecting driver's knees in a serious vehicle collision comprises semicylindrical inner and outer protectors reinforced by beading or projecting which are installed opposite to the drivers knees while a part of each protector is overlapped with each other. With this structure, the impact force in the collision is received by the knee protector device while stabilized at a desired value, so that the knee protector device efficiently absorbs the impact force.

2 Claims, 3 Drawing Sheets

KNEE PROTECTOR DEVICE FOR AUTOMOTIVE VEHICLE

BACKGROUND OF THE INVENTION

1. Field of the Invention

The present invention relates to improvements in a driver's knee protector which is disposed at a lower portion of a steering column of an automotive vehicle so as to be opposite to driver's knees, and more particularly to a knee protector which protect driver's knees in the event of a serious vehicle collision.

2. Description of the Prior Art

It is well known that automotive vehicles are usually provided with knee protectors each of which is disposed around the steering column so as to protect the driver's knees in the event of a vehicle serious collision.

One of typical knee protectors is disclosed in Japanese Utility Model Provisional Publication No. 58-150552. This protector device includes a base plate made of metal which is connected to a steering column. A protector plate for absorbing the impact force by collision is connected to the base plate to have a space therebetween. When the driver's knee hits the protector plate in the event of a serious vehicle collision, the driver's knee is protected by the protector device since the impact force by collision is absorbed in the protector device in a manner that the protector plate is plastically deformed toward the base plate.

However, it is difficult that the knee protector sufficiently absorbs the impact force by the collision with one protector plate since the knee protector is restricted in size.

SUMMARY OF THE INVENTION

It is an object of the present invention to provide an improved knee protector device with which the impact force of the vehicle collision is sufficiently absorbed while being formed in a predetermined size.

Another object of the present invention is to provide an improved knee protector device having the following energy absorbing characteristics: The load applied to the driver's knees is sharply increased as soon as the driver's knees hit the knee protector device and then after stabilized in a desired value, so that the energy absorption amount is largely increased.

A further object of the present invention is to provide a knee protector device which securely protects the driver's knees in the event of the serious vehicle collision.

A knee protector device for an automotive vehicle according to the present invention is disposed opposite to driver's knees and to cross over a steering column of the automotive vehicle. The knee protector device comprises a protector base which has first and second side portions opposite to each other relative to the steering column. The protector base is connected to a body of the automotive vehicle. An inner protector of a generally semicylindrical shape is fixedly connected to the first and second side portions of the protector base so as to be located opposite to the driver's knees. An outer protector of a generally semicylindrical shape is located between the inner protector and the driver's knees and connected to the first and second side portions of the protector base. At least a part of the outer protector is overlapped on at least a part of the inner protector.

With this arrangement, the energy absorption characteristics is improved so as to quickly start to absorb the energy absorption in the event of a serious vehicle collision in a manner to appropriately heighten the initial load for plastic deformation of the knee protector device. Therefore, the absorption amount of the energy by the knee protector device is remarkably increased, so that the driver's knees are securely protected while coming into the serious vehicle collision.

DETAILED DESCRIPTION OF THE INVENTION

Figure 1:
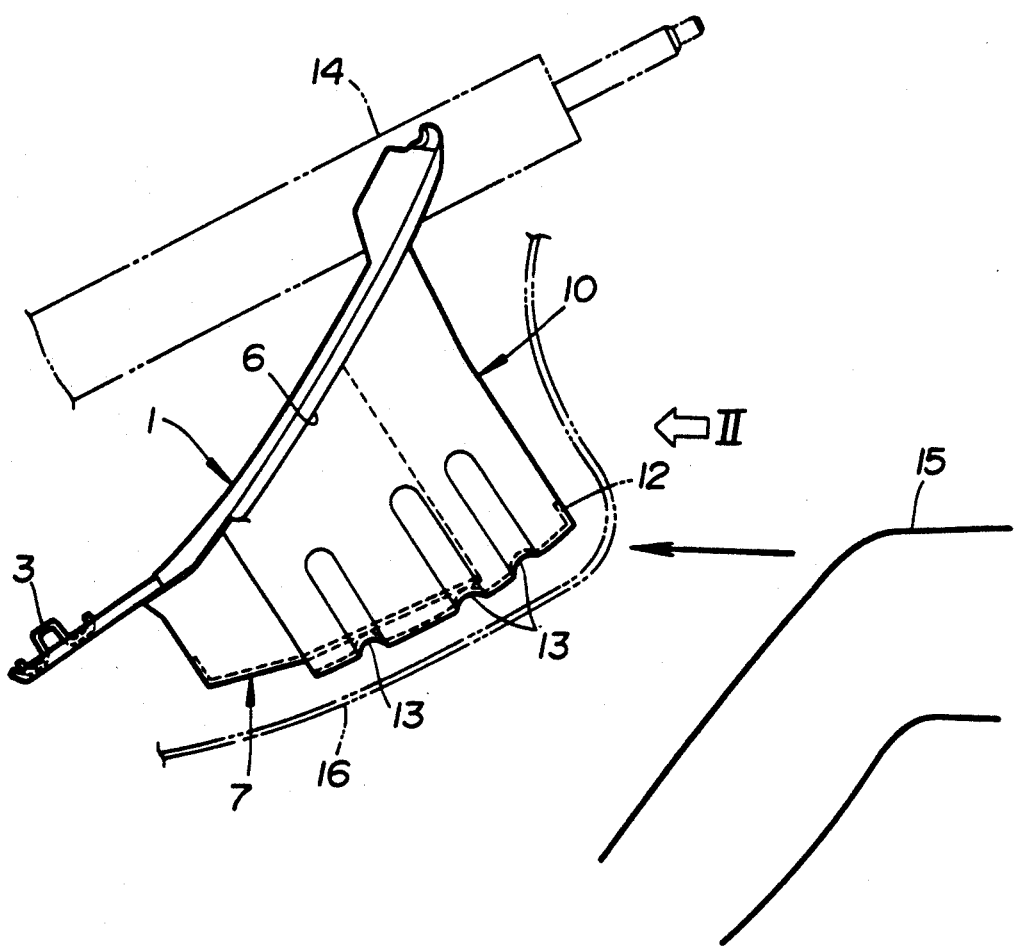
FIG. 1 is a side view of an embodiment of a knee protector device according to the present invention.
Figure 2:
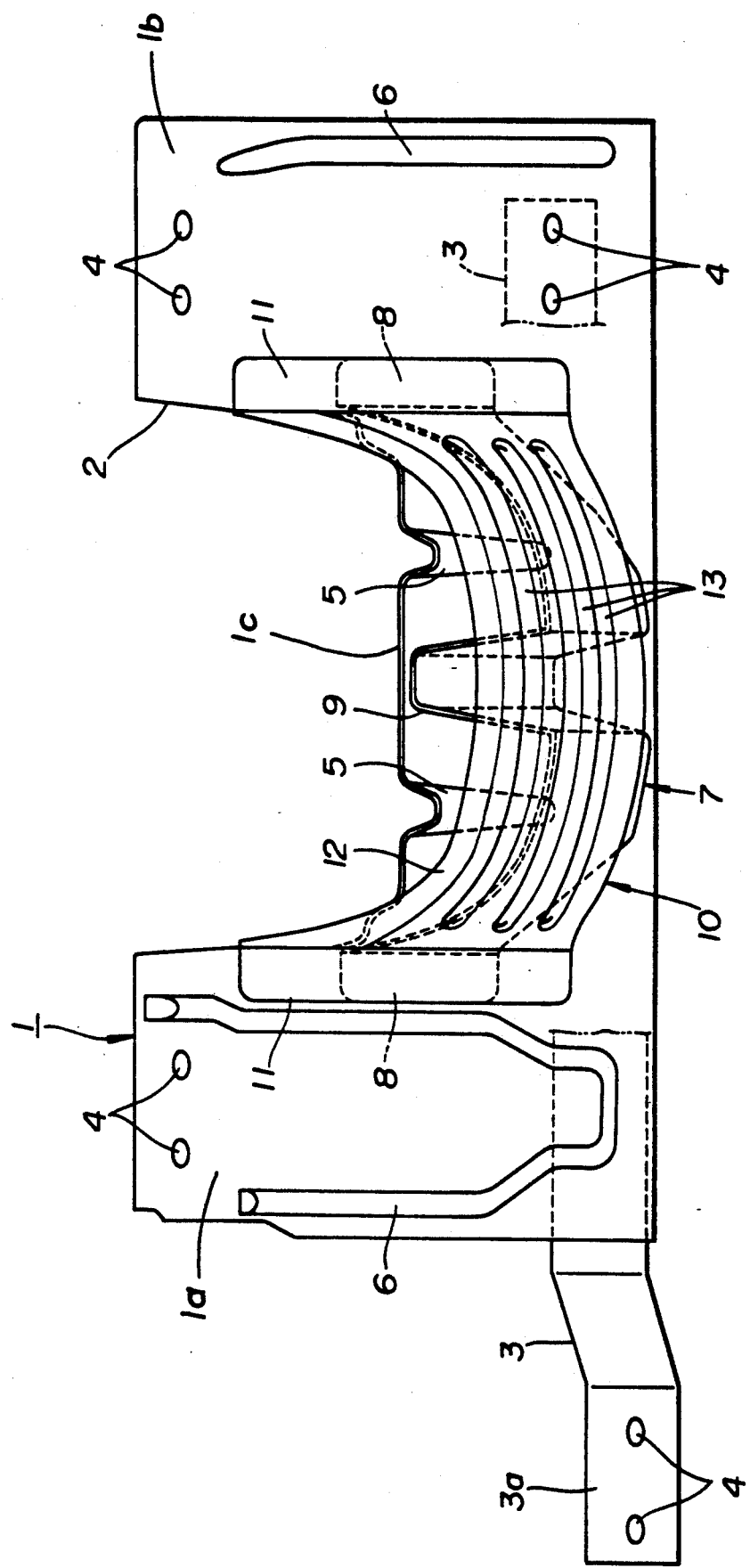
FIG. 2 is a front view of the knee protector device as viewed from the direction of an arrow II of FIG. 1.
Figure 3:
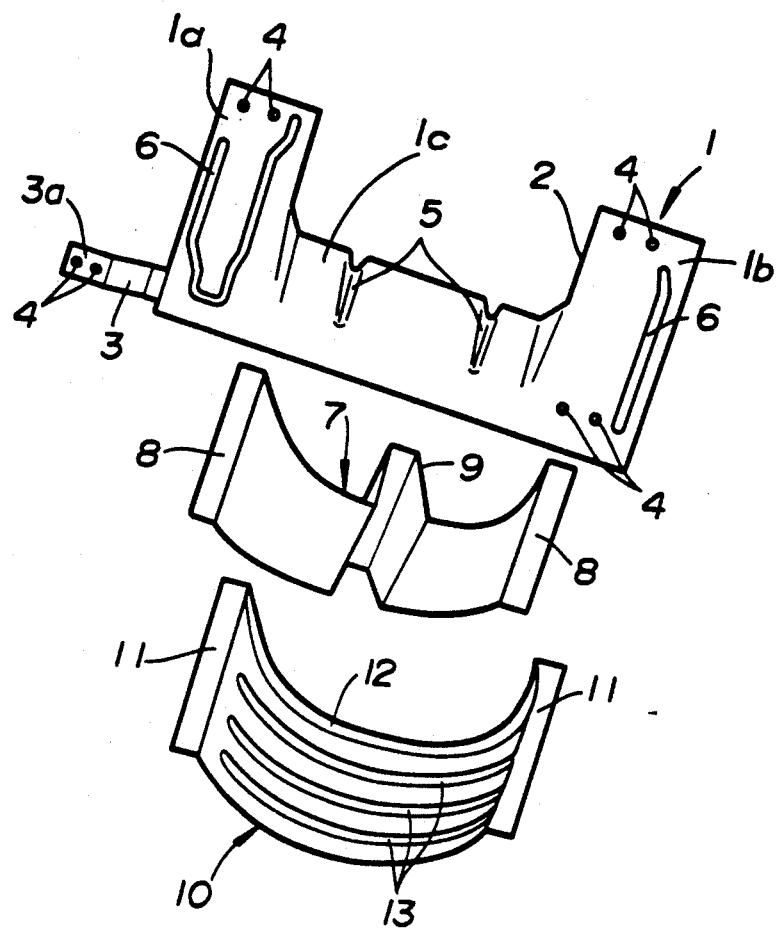
FIG. 3 is an exploded perspective view of the knee protector device of FIG. 1.

Referring now to FIGS. 1 to 3, an embodiment of a knee protector device for an automotive vehicle according to the present invention is illustrated by the reference character U. The knee protector device U comprises a protector base 1 defining a cutaway 2 at its upper middle portion so as to enable to tilt the steering column 14. A belt-shaped reinforcing plate 3 is connected to a front lower surface of the protector base 1. The protector base 1 has first and second portions 1a and 1b which are located opposite to each other relative to a steering column of the automotive vehicle. An end portion of the reinforcing plate 3 extends outside of the first and second portions 1a, 1b and acts as a bracket 3a to support the knee protector device U. The bracket 3a has installation holes 4 through which the protector base 1 is fixedly connected to an instrument panel (not shown) with bolts (not shown). The protector base 1 is formed to project as its lower middle portion near the cutaway 2 in the downwardly inclined direction. The protector base 1 has first and second portions 1a and 1b which are located opposite to each other relative to a steering column of the automotive vehicle. A bead 5 is formed at each side portion of the projecting part 1c of the protector base 1. The other bead 6 is formed at each of the first and second portions 1a and 1b. With this arrangement, the protector base 1 is reinforced so as not to be easily deformed by the hit of the driver's knees.

A inner protector 7 formed semicircular in cross-section, that is, formed in a generally semicylindrical shaped, has a pair of installation flanges 8 at its opposite side end portions. The installation flanges are fixedly connected respectively to the first and second portions 1a and 1b by spot welding. The inner protector 7 has a supporting wall portion 9 projecting from a center portion of the inner protector 7 toward the protector base 1. A bottom surface of the supporting wall portion 9 is fixedly connected to the protector base 1 by spot welding. An outer protector 10 formed semicircular in cross-section (formed in a generally semicylindrical shape) has an installation flange 11 at each side end as the inner protector 7 is provided with the installation flange 8. The outer protector 10 is connected at its installation flange 11 to the protector base 1 to cover a part of the inner protector 7. The overlapping portion between the inner and outer protectors 7, 10 is located opposite to driver's knees 15.

The outer protector 10 is bent inwardly at its upper periphery and formed at its curving portion to have three reinforcing beads 13 extending laterally along a curving surface of the outer protector 10. The outer protector 10 is disposed at a slightly upper position as compared with the inner protector 7 so that the driver's knee first hits the upper portion of the outer protector 10 in the event of a serious vehicle collision or the like. Lower two of the three reinforcing beads 13 are overlapped and contacted with the outer surface of the inner protector 7. The inner and outer protectors 7 and 10 are covered with a column cover 16 made of a plastic.

The manner of operation of the thus arranged knee protector device U will be discussed hereinafter.

Figure 4:
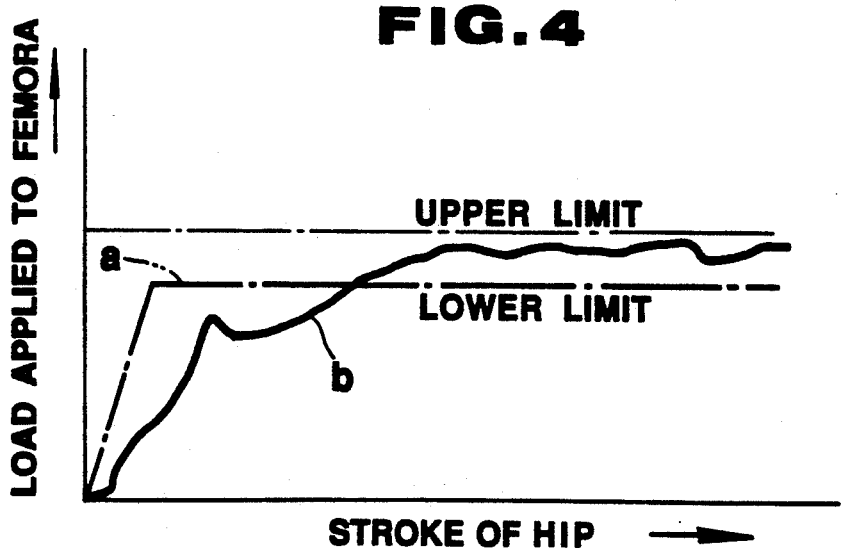
FIG. 4 is a graph showing the energy absorption characteristics by the knee protector device.

When the automotive vehicle comes into a serious collision, the driver's knee first hits the upper portion of the outer protector 10 through the column cover 16 and plastically deforms the outer protector 10. Since the outer protector 10 is reinforced by the reinforcing flange 12 and reinforcing beads 13, an initial load for a plastic deformation of the outer protector 10 is relatively high. Accordingly, the impact force is rapidly absorbed by the knee protector device U. While the plastic deformation of the outer protector 10 is processed, the inner protector 7 begins to plastically deform. Since the supporting wall portion 9 is connected to the protector base 1 so as to prevent the inner protector 7 form being easily deformed, the load for the plastic deformation of the inner protector 7 is relatively high. For this reason, the energy absorption characteristics of the knee protector device U, which is mainly owing to the degree of the load for the plastic deformation of the inner and outer protectors 7 and 10, is represented by a line b as shown in FIG. 4.

The knee protector device U has the following energy absorption characteristics: The load applied to the driver's femora (or knees) is sharply increased as soon as the driver's knees hit the knee protector device U, and stabilized between the upper limit load and the lower limit load as shown in FIG. 4. Therefore, the line b becomes similar to a line a showing the ideal characteristics of the energy absorption, so that the total amount of the energy absorption is remarkably enlarged.

Accordingly, with the thus arranged knee protector device U, the knee protector device U safely protects the driver's knees in the event of a serious vehicle collision.

What is claimed is:

1. A knee protector device for an automotive vehicle which is disposed opposite to driver's knees and crosses over a steering column of the automotive vehicle, said knee protector device comprising:
    a protector base having first and second side portions opposite to each other relative to the steering column, said protector base being connected to a body of the automotive vehicle;
    an inner protector of a generally semicylindrical shape fixedly connected to said first and second side portions of said protector base so as to be located opposite to the driver's knees, said inner protector having a supporting wall portion which projects at its center portion to said protector base, an end portion of said supporting wall portion being connected to said protector base; and
    an outer protector of a generally semicylindrical shape located between said inner protector and the driver's knees, said outer protector being connected to said first and second side portions of said protector base, at least a part of said outer protector being overlapped on at least a part of said inner protector.

2. A knee protector device as claimed in claim 1, wherein said outer protector is provided with a bead projecting toward to be in contact with the outer surface of said inner protector.

* * * * *